United States Patent [19]

Ohmae et al.

[11] Patent Number: 5,010,136

[45] Date of Patent: Apr. 23, 1991

[54] PROCESS FOR PRODUCING IMPACT-RESISTANT POLYAMIDE RESIN COMPOSITIONS

[75] Inventors: Tadayuki Ohmae, Chiba; Yoshiki Toyoshima, Ichihara; Kentaro Mashita, Ichihara; Noboru Yamaguchi, Ichihara; Jinsho Nambu, Chiba, all of Japan

[73] Assignee: Sumitomo Chemical Company, Limited, Osaka, Japan

[21] Appl. No.: 391,168

[22] Filed: Aug. 9, 1989

[30] Foreign Application Priority Data

Aug. 23, 1988 [JP] Japan ................. 63-209676

[51] Int. Cl.$^5$ ............................. C08L 77/00
[52] U.S. Cl. ........................ 525/66; 525/183; 525/179
[58] Field of Search ................... 525/66, 183

[56] References Cited

FOREIGN PATENT DOCUMENTS 0258040 3/1988 European Pat. Off. .
60-181160 9/1985 Japan .

*Primary Examiner*—Ana L. Carrillo
*Attorney, Agent, or Firm*—Stevens, Davis, Miller & Mosher

[57] ABSTRACT

An impact-resistant polyamide resin is produced by preparing Mixture (I) by melt-kneading (A) a polyamide resin with (B) at least one modified olefin polymer selected from the group consisting of olefin rubbers having an unsaturated dicarboxylic acid anhydride added thereto, α-olefin polymers having an unsaturated dicarboxylic acid anhydride added thereto, crystalline ethylene-α-olefin copolymers having an unsaturated dicarboxylic acid anhydride added thereto, and ethylene-ethylenic unsaturated ester copolymers having an unsaturated dicarboxylic acid anhydride added thereto, preparing Mixture (II) by melt-kneading Mixture (I) with (C) a polyfunctional compound having in the molecule two or more functional groups reactive with carboxyl group, carboxylic acid anhydride group or amino group, and melt-kneading Mixture (II) with (D) a polyamide resin.

The impact-resistant polyamide resin composition obtained by the process of the present invention has an excellent processability and can be made into various molded products, sheets or films by injection molding or extrusion molding. The thus obtained products have good physical properties, in particular, an excellent impact strength.

8 Claims, No Drawings

PROCESS FOR PRODUCING IMPACT-RESISTANT POLYAMIDE RESIN COMPOSITIONS

The present invention relates to a process for producing a polyamide resin composition which can be utilized in the form of molded articles, sheets, films, etc. by means of injection molding, extrusion molding, etc.

More particularly, the present invention relates to a process for producing a polyamide resin composition having an excellent impact resistance, a good balance in other physical properties and a good processability, which process comprises melt-kneading a polyamide resin with an olefin polymer modified with an unsaturated dicarboxylic acid anhydride in a specific blending manner.

Polyamide resins have been widely used as engineering plastics because of their good stiffness, wear resistance, chemical resistance, heat resistance and electrical properties.

They, however, are poor in impact resistance, molding stability, etc. Such defects are obstacles to opening-up of new avenues of practical use for them.

Various methods have heretofore been proposed for improving the low impact resistance, a defect of polyamide resins.

Typical methods for the improvement are, for example, methods comprising adding a polymer of modified ethylene copolymer containing active groups reactive with polyamide resins and having a rubber elasticity, as disclosed in JP-A-53-146754, JP-B-54-4743, JP-B-5544108, JP-A-58-23850, etc.

However, as a result of examination, the present inventors have found that although a molded product having a somewhat improved impact resistance can be obtained according to the above prior art, the improvement is not sufficient. Furthermore, the molded product was found to be unsatisfactory from the viewpoint of balance in physical properties such as heat resistance, stiffness and impact resistance.

That is, it was found that the somewhat improved impact resistance and flexibility of the molded product are offset by its mechanical properties such as stiffness, tensile strength, hardness, heat resistance, etc., which are considerably inferior to those of polyamide resins themselves. Moreover, the above prior art methods are disadvantageous, for example, in that they often yield a colored molded product having an ugly appearance, whose applications are limited.

Thus, there has not yet been produced any polymer of modified ethylene copolymer type which is suitable for addition to a polyamide resin and does not cause the problems described above, and it has been strongly desired to develop a polyamide resin composition which has an improved impact resistance without deterioration of other physical properties.

The present invention was made in order to improve the low impact resistance, the defect of a polyamide resin while solving the above problems without deterioration of its mechanical properties such as heat resistance and stiffness, by melt-kneading a specific olfein polymer modified with an unsaturated dicarboxylic acid anhydride with the polyamide resin by a special blending method. An object of this invention is to provide a process for producing a polyamide resin composition comprising a polyamide resin as its main constituent, which is excellent in impact resistance, mechanical properties such as heat resistance, stiffness and the like, and flow properties.

According to the present invention, there are provided a process for producing an impact-resistant polyamide resin composition which comprises (1) preparing Mixture (I) by melt-kneading (A) 60 to 20 parts by weight of a polyamide resin with (B) 40 to 80 parts by weight of at least one modified olefin polymer selected from the group consisting of olefin rubbers having 0.01 to 9% by weight of an unsaturated dicarboxylic acid anhydride added thereto, $\alpha$-olefin polymers having 0.01 to 9% by weight of an unsaturated dicarboxylic acid anhydride added thereto, crystalline ethylene-$\alpha$-olefin copolymers having 0.01 to 9% by weight of an unsaturated dicarboxylic acid anhydride added thereto, and ethylene-ethylenic unsaturated ester copolymers having 0.01 to 9% by weight of an unsaturated dicarboxylic acid anhydride added thereto, (2) preparing Mixture (II) by melt-kneading 100 parts by weight of Mixture (I) with (C) 0.01 to 20 parts by weight of a polyfunctional compound having in the molecule two or more functional groups reactive with carboxyl group, carboxylic acid anhydride group or amino group, and (3) melt-kneading 100 parts by weight of Mixture (II) with (D) 50 to 1,000 parts by weight of a polyamide resin; and a process for producing an impact-resistant polyamide resin composition which comprises (1) preparing Mixture (I) by melt-kneading (A) 60 to 20 parts by weight of a polyamide resin with (B) 40 to 80 parts by weight of a modified olefin polymer obtained by melt-kneading 100 parts by weight of at least one olefin polymer having a glass transition temperature of $-10°$ C. or lower selected from the group consisting of olefin rubbers, $\alpha$-olefin polymers, crystalline ethylene-$\alpha$-olefin copolymers and ethyleneethylenic unsaturated ester copolymers, with 0.1 to 10 parts by weight of an unsaturated dicarboxylic acid anhydride, (2) preparing Mixture (II) by melt-kneading 100 parts by weight of Mixture (I) with (C) 0.01 to 20 parts by weight of a polyfunctional compound having in the molecule two or more functional groups reactive with carboxyl group, carboxylic acid anhydride group or amino group, and (3) melt-kneading 100 parts by weight of Mixture (II) with (D) 50 to 1,000 parts by weight of a polyamide resin.

The polyamide resins as components (A) and (D) in this invention are high molecular weight polymers in which amide linkages (CONH) occur along the molecular chain obtained, for example, by ring opening polymerization of a lactam of a ring having not less than three carbon atoms, polymerization of an $\omega$-amino acid, or polycondensation of a dibasic acid and a diamine.

Specific examples of the polyamide resins are homopolymers of $\epsilon$-caprolactam, aminocaproic acid, enantholactam, 7-aminoheptanoic acid, 11-aminoundecanoic acid, etc.; polymers obtained by polycondensation of a diamine such as butanediamine, hexamethylenediamine, nonamethylenediamine, undecamethylenediamine, dodecamethylenediamine, methaxylenediamine or the like and a dicarboxylic acid such as terephthalic acid, isophthalic acid, adipic acid, sebacic acid, dodecane dibasic acid, glutaric acid or the like; and copolymers of the above monomers.

More specific examples of the polyamide resins are aliphatic polyamide resins such as polyamide 46, polyamide 6 (poly-ε-caprolactam), polyamide 66 (polyhexamethylene adipamide), polyamide 610 (polyhexamethylene sebacamide), polyamide 11 (poly-11-aminoundecanoic acid), polyamide 12 (polylauric lactam), polyamide 612 (polyhexamethylene dodecanoamide), etc., and aromatic polyamide resins such as polyhexamethylenediamineterephthalamide, polyhexamethyleneisophthalamide, xylenegroup-containing polyamides, etc.

Of these, polyamide 6, polyamide 66 and polyamide 12 are particularly preferable.

In addition, various copolymer Nylon resins having a melting point of 80° to 200° C. which are commercially available as resins for hot-melt adhesives and the like, can also be used alone or in combination with polyamides having a melting point of 200° C. or higher.

In the present invention, the polyamide resins as components (A) and (B) may be the same or different.

The olefin polymer modified with an unsaturated dicarboxylic acid anhydride used in the component (B) of this invention is at least one modified olefin polymer selected from the group consisting of olefin rubbers having 0.01 to 9% by weight of an unsaturated dicarboxylic acid anhydride added thereto, α-olefin polymers having 0.01 to 9% by weight of an unsaturated dicarboxylic acid anhydride added thereto, crystalline ethylene-α-olefin copolymers having 0.01 to 9% by weight of an unsaturated dicarboxylic acid anhydride added thereto, and ethylene-ethylenic unsaturated ester copolymers having 0.01 to 9% by weight of an unsaturated dicarboxylic acid anhydride added thereto. The amount of unsaturated dicarboxylic acid anhydride added is preferably 0.1 to 2% by weight, more preferably 0.3 to 1.6% by weight.

The olefin polymer modified with an unsaturated dicarboxylic acid anhydride can be produced by meltkneading 100 parts by weight of at least one olefin polymer having a glass transition temperature of −10° C. or lower selected from the group consisting of olefin rubbers, α-olefin polymers, crystalline ethyleneαolefin copolymers and ethylene-ethylenic unsaturated ester copolymers, with 0.1 to 10 parts by weight of an unsaturated dicarboxylic acid anhydride. The blending amount of the unsaturated dicarboxylic acid anhydride is preferably 0.5 to 5 parts by weight, more preferably 1 to 2 parts by weight.

Specific examples of the olefin rubber are rubbers comprising a copolymer of ethylene and an αolefin having 3 or more carbon atoms. More specific examples thereof are copolymers of ethylene and propylene, butene-1, hexene-1, 4-methylbutene-1, 4methylpentene-1 or the like. Of these, copolymer rubber of ethylene and propylene is particularly preferable. These ethylene copolymer rubbers may be terpolymers further comprising a nonconjugated diene such as methylenenorbornene, ethylidenenorbornene, 1,4-hexadiene, dicylopentadiene, etc. in addition to ethylene and an α-olefin having 3 or more carbon atoms. There can be further exemplified butyl rubbers, ethylene-acrylic ester copolymer rubbers, etc.

Specific examples of the α-olefin polymer and the crystalline ethylene-α-olefin copolymer are polyisobutylenes, crystalline propylene-ethylene copolymers and crystalline ethylene-butylene copolymers.

Specific examples of the ethylene-ethylenic unsaturated ester copolymer are ethylene-α,β-unsaturated carboxylic acid alkyl ester copolymers, ethylenecarboxylic acid vinyl ester copolymers, ethylene-α,β-unsaturated carboxylic acid alkyl ester-carboxylic acid vinyl ester terpolymers. More specific examples thereof are copolymers of ethylene and at least one monomers selected from the group consisting of methyl acrylate, methyl methacrylate, ethyl acrylate, ethyl methacrylate and vinyl acetate. Of these, ethylene-methyl methacrylate copolymers and ethylene-vinyl acetate copolymers are preferable.

The olefin polymer used in the present invention is an olefin polymer having a glass transition temperature of −10° C. or lower. When the glass transition temperature is higher than −10° C., the improvement in impact resistance of the resulting polyamide resin composition is not sufficient in some cases.

The unsaturated carboxylic acid anhydride includes, for example, maleic anhydride, itaconic anhydride, citraconic anhydride, bicyclo[2,2,1]hepta-5ene-2,3-dicarboxylic acid anhydride (himic acid anhydride), tetrahydrophthalic anhydride, bicyclo[2,2,2]octa-5ene-2,2-dicarboxylic acid anhydride, 4-methylcyclohexa4-ene-1,2-dicarboxylic acid anhydride, 1,2,3,4,5,8,9,10octahydronaphthalene-2,3-dicarboxylic acid anhydride, and 7-oxabicyclo[2,2,1]hepta-5-ene-2,3-dicarboxylic acid anhydride. Of these, maleic anhydride is particularly preferable.

The olefin polymer modified with an unsaturated dicarboxylic acid in this invention is produced by melt-kneading 100 parts by weight of an olefin polymer with 0.1 to 10 parts by weight of an unsaturated dicarboxylic acid anhydride. When the amount used of the unsaturated dicarboxylic acid anhydride is less than 0.1 part by weight, the improvement in impact resistance of the resulting polyamide resin composition is not sufficient. When it exceeds 10 parts by weight, the amount of a gel formed is disadvantageously increased.

In melt-kneading the unsaturated dicarboxylic acid anhydride, it is preferable to add a free-radical initiator which generates a radical effectively at the melt-kneading temperature. Specific examples of the free-radical initiator are organic peroxides such as 1,3-bis(t-butylperoxyisopropyl)benzene, 1,1-bis(tbutylperoxy)-3,3,5-trimethylcyclohexane, t-butyl peroxylaurate, dicumyl peroxide and benzoyl peroxide. When a free-radical initiator is used, the amount used is preferably 0.01 to 5 parts by weight, more preferably 0.02 to 2 parts by weight, most preferably 0.08 to 1 part by weight, per 100 parts by weight of the olefin polymer.

In melt-kneading the unsaturated dicarboxylic acid anhydride, an aromatic vinyl monomer such as styrene may be added in an amount of 0.1 to 5 parts by weight, preferably 0.2 to 3 parts by weight, more preferably 0.5 to 1 part by weight, per part by weight of the unsaturated dicarboxylic acid anhydride (these amounts correspond to 0.01 to 50 parts by weight, 0.02 to 30 parts by weight and 0.05 to 10 parts by weight, respectively, per 100 parts by weight of the olefin polymer). The addition of an aromatic monomer permits reduction of the amount of a gel generated and increase of the amount of the unsaturated dicarboxylic acid anhydride added to the olefin polymer, and hence is very preferable for conducting the present invention.

The temperature at which the olefin polymer and the unsaturated dicarboxylic acid anhydride are melt-kneaded together is not critical. It is preferably 180° to 300° C. Although a kneading machine for the melt-kneading is not critical, an extruder is usually preferred because it permits continuous production.

The component (C) used in this invention, i.e., the polyfunctional compound containing in the molecule two or more functional groups reactive with carboxyl group, carboxylic acid anhydride group or amino group, is not critical so long as it is a compound having intermolecular crosslinking reactivity with the modified olefin polymer (B) or the polyamide resin (A).

As the polyfunctional compound as the component (C), there can be exemplified compounds which contain in the molecule two or more functional groups selected from the group consisting of amino group, epoxy group, dihydrooxazolyl group, carboxyl group, carboxylic acid anhydride group and hydroxyl group. The molecular weight of the polyfunctional compound (C) is not critical and the polyfunctional compound (C) also includes polymeric compounds.

Specific examples of the compound containing two or more amino groups in the molecule are given below.

There can be used, for example, aliphatic diamines such as 1,6-hexamethylenediamine, trimethylhexamethylenediamine, 1,4-diaminobutane, 1,3-diaminopropane, ethylenediamine, polyether diamine, etc.; aliphatic diamine carbamates such as hexamethylenediamine carbamate, ethylenediamine carbamate, etc.; aliphatic polyamines such as diethylenetriamine, triethylenetetramine, tetraethylenepentamine, pentaethylenehexamine, ethylaminoethylamine, methylaminopropylamine, 2-hydroxyethylaminopropylamine, aminoethyl ethanolamine, 1,3bis(3-aminopropoxy)-2,2-dimethylpropane, 1,3,6-trisaminomethylhexane, iminobispropylamine, methyliminobispropylamine, bis(hexamethylene)trimaine, etc.; alicyclic polyamines such as menthene diamine, N-aminoethyl piperazine, 1,3-diaminocyclohexane, isophorone diamine, bis(4-amino-3-methylcyclohexyl)methane, etc.; aliphatic polyamines having an aromatic ring, such as m-xylylenediamine, etc.; aromatic amines such as diaminodiphenyl ether, 4,4-methylenedianiline, diaminodiphenylsulfone, benzidine, 4,4'-bis(o-toluidine), 4,4'-thidianiline, dianisidine, methylenebis(o-chloroaniline), bis(3,4-diaminophenyl)-sulfone, diaminoditolylsulfone, etc.; silicon-containing polyamines such as 1,3-bis(γ-aminopropyl)-1,1,3,3-tetramethyldisiloxane, etc.; aminemodified silicone oil; butadiene-acrylonitrile copolymers whose terminal functional group is an amine; tertiary amine compounds such as N,N,N',N'-tetramethylhexamethylenediamine, N,N,N',N'',N''-pentamethyldiethylenetriamine, etc.; ethylene copolymers consisting of ethylene units and N,N-dialkylaminoalkyl α,β-unsaturated carboxylic acid ester units, such as copolymers of ethylene and N,N-dimethylaminoethyl methacrylate, etc.; and ethylene copolymers consisting of ethylene and N,N-dialkylaminoalkyl α,β-unsaturated carboxylic acid amide units, such as copolymers of ethylene and N,N-dimethylaminopropylacrylamide, etc.

Specific examples of the compound containing two or more epoxy groups in the molecule are given below.

They are roughly divided into epoxy-groupcontaining olefin copolymers and epoxy compounds.

As the epoxy-group-containing olefin copolymers, there can be used olefin-glycidyl methacrylate copolymers, olefin-glycidyl acrylate copolymers, and olefin-glycidyl methacrylate-glycidyl acrylate terpolymers. Specific examples of olefin are ethylene, propylene, butene-1, isobutylene, etc. Of these, ethylene is particularly preferable. The epoxy-group-containing olefin copolymers may further comprise as comonomer an α,β-unsaturated carboxylic acid alkyl ester and/or a carboxylic acid vinyl ester. Specific examples of the alkyl esters are alkyl esters of acrylic acid, methacrylic acid and the like. Specific examples of the alkyl esters and the vinyl esters are methyl acrylate, ethyl acrylate, nbutyl acrylate, methyl methacrylate, vinyl acetate and vinyl propionate. As the epoxy-group-containing olefin copolymers, there can also be exemplified glycidylmethacrylate-modified ethylene-propylene rubber, ethylene-methyl acrylate-glycidyl methacrylate copolymer rubber, etc.

As to a polymerization method, the epoxy-groupcontaining olefin copolymer may be produced by any of random copolymerization, block copolymerization and graft copolymerization. The content of glycidyl methacrylate and/or glycidyl acrylate units in the olefin copolymer is chosen in the range of 1 to 50% by weight. When the content is outside this range, the improvement in physical properties of the amide resin composition is not sufficient in some cases.

As the epoxy compounds, there can be exemplified, for example, glicidyl ethers of bisphenols such as bisphenol A, resorcinol, hydroquinone, etc., or halides of these bisphenols. Of these, epoxy resins are preferred.

These epoxy compounds are used alone or as a mixture thereof.

In general, epoxy compounds are used as a blend with a curing agent such as amine, acid anhydride, polymercaptan, phenol resin or the like. In the present invention, no curing agent is usually used but a curing agent may be used so long as the amount of its active hydrogen is equimolar with or smaller than the amount of the epoxy group component.

Specific examples of epoxy resins include bisphenol A epoxy resins, bisphenol F epoxy resins, novolak type epoxy resins, cyclic aliphatic epoxy resins, glycidyl ester resins, glycidylamine resins, hydantoin type epoxy resins, triglycidyl isocyanurate, etc.

Specific examples of compound containing two or more hydroxyl groups in the molecule are trimethylolpropane, pentaerythritol, saponified copolymers of ethylene and vinyl acetate, etc.

Compounds containing two or more dihydrooxazolyl groups in the molecule can also be used and they include 2,2-(1,3-phenylene)-bis(2-oxazoline), copolymers of styrene and vinyloxazoline, etc.

In the polyamide resin composition according to the present invention, the mixture (I) comprises the polyamide resin as component (A) and the modified olefin polymer as component (B) in amounts of 60 to 20 parts by weight and 40 to 80 parts by weight, respectively, per 100 parts by weight of the whole Mixture (I). When the content of the polyamide resin component (A) in Mixture (I) is less than 20 parts by weight, the stiffness and the heat resistance of the resulting polyamide resin composition are not sufficient. When it exceeds 60 parts by weight, no desirable effect on the impact resistance of the resulting polyamide resin composition can be obtained. The weight ratio of the component (A) to the component (B) is preferably 60–30/40–70, more preferably 50–40/50–60.

In the present invention, although the amount added of the polyfunctional compound as component (C) should be adjusted depending on the reactivity of functional group of the polyfunctional compound with carboxyl group, carboxylic acid anhydride group or amino group, it is usually 0.01 to 20 parts by weight, preferably 5 to 15 parts by weight, more preferably 8 to 13 parts by weight, per 100 parts by weight of the total amount of the polyamide resin component (A) and the modified olefin polymer component (B) [the amount of the whole Mixture (I)]. Thus, Mixture (II) can be obtained. When the amount added of the polyfunctional compound as component (C) in Mixture (II) is less than 0.01 part by weight, there is brought about insufficient improving effects on mechanical properties such as heat resistance and stiffness of the polyamide resin composition in some cases. When it exceeds 20 parts by weight, the effect of the polyfunctional compound hits the ceiling in some cases.

The amount added of the polyamide resin as component (D) in the present invention is 50 to 1,000 parts by weight, preferably 100 to 500 parts by weight, more preferably 100 to 200 parts by weight, per 100 parts by weight of Mixture (II). When the amount added is less than 50 parts by weight, the stiffness and the heat resistance of the polyamide resin composition are not sufficient. When it exceeds 1,000 parts by weight, no desirable effect on the impact resistance of the polyamide resin composition can be obtained.

The process for producing a polyamide resin composition of the present invention comprises meltkneading the starting materials in molten state. A method for blending the starting materials in said process comprises melt-kneading the polyamide resin component (A) with the modified olefin polymer component (B) to obtain partially crosslinked Mixture (I), adding thereto the polyfunctional compound (C), melt-kneading the resulting mixture to carry out partial crosslinking reaction, thereby preparing Mixture (II), then adding thereto the polyamide resin as component (D), and meltkneading the resulting mixture.

The polyamide resin composition of the present invention has very good balance in various physical properties of molded product, for example, mechanical properties such as impact resistance and the like and thermal properties. In particular, the product possesses an increased stiffness and melt index and hence an improved processability by virtue of the subsequent addition of the polyamide resin as component (D) followed by melt-kneading.

The reason why the melt-kneading by the above specified blending method brings about a marked physicalproperties-improving effect is assumed that a microdispersed state of a polymer having satisfactory physical properties is formed by moderate crosslinking action.

When the polyamide resin (A) and the modified olefin polymer (B) are melt-kneaded together, the modified olefin polymer becomes a matrix phase at the beginning of melt-kneading because its melting point is lower than that of the polyamide resin. When the melt-kneaing is further continued and the polyadmide resin as component (D) is added, the volume of the polyamide resin components becomes larger than that of the modified olefin polymer, so that the polyamide resins undergo phase inversion to a matrix phase. Therefore, in the present invention, the phase inversion is stopped en route by adding a partial-crosslinking agent consisting of a polyfunctional compound.

As a result, there is formed a multi-dispersed state in which a modified olefin polymer phase containing polyamide resin particles is dispersed in the polyamide resins. This dispersed state is similar to that formed in the case of impact-resistant polystyrene and is considered to give the most desirable physical properties.

The shape and size of the olefin polymer phase are not essentially critical. In this point, the present invention can be said to be a novel technical idea which is clearly distinguishable from the ideas of the prior art (disclosed in JP-B-55-44108, JP-A-61163960, etc.) that when the particle size of rubbery dispersed phase of an olefin polymer component or the like is as very small as, for example, less than 1 micron, its improving effect is excellent to a certain degree.

In general, the improvement of resistance to thermal deformation tends to result in an increased stiffness and a lowered impact resistance. By contrast, in the case of the composition obtained by the process of the present invention, the heat resistance and the impact resistance can be improved with good balance between them without deterioration of other physical properties. Such the improvement cannot be expected nor anticipated from the prior art.

For the melt-kneading in the process of this invention, there can be used a conventional kneading apparatus, for example, various extruders such as single- or twin-screw extruders, Banbury mixer, roll mill, and other various kneaders.

The polyfunctional compound component (C) of the present invention is added and melt-kneaded, for example, in the following manners. A melt-kneaded mixture of the polyamide component (A) and the modified olefin polymer component (B) is prepared in the form of particles with an extruder, and then the polyfunctional compound component (C) is added thereto, followed by melt-kneading the resulting mixture with an extruder. Thus, the polyamide resin composition of this invention can be produced. Preferably, using an extruder equipped with a side-feed device, a meltkneaded mixture of the polyamide resin component (A) and the modified olefin polymer component (B) is prepared in the anterior (front) part of the extruder, and the polyfunctional compound (C) in solid or molten state is added thereto in the posterior (back) part of the extruder by means of the side-feed device, followed by melt-kneading the resulting mixture, whereby the polyamide resin composition is produced.

It is also preferable to prepare a master batch by melt-kneading the polyfunctional compound component (C) with a resin inert thereto previously, add an adequate amount of the batch at the time of production, and melt-knead the resulting mixture.

The polyamide resin as component (D) of the present invention is added and melt-kneaded, for example, in the following manners. Mixture (II) consisting of the polyfunctional compound (C) and Mixture (I) obtained by melt-kneading the polyamide resin component (A) with the modified olefin polymer component (B) is prepared in the form of particles, for example, with an extruder, and then the polyamide resin as component (D) is added thereto, followed by melt-kneading the resulting mixture with an extruder. Thus, the polyamide resin composition of this invention can be produced. Preferably, said polyamide resin composition can be produced using an extruder equipped with a sidefeed device. In detail, it is preferable to produce said composition by preparing Mixture (I) at first by melt-kneading the polyamide resin component (A) with the modified olefin polymer component (B) in the anterior (front) part of the extruder, then preparing Mixture (II) by adding the polyfunctional compound (C) in the middle (intermediate) part of the extruder through the side-feed device, and adding the polyamide resin as component (D) in molten or solid state in the posterior (back) part of the extruder through the side-feed device, and finally by melt-kneading the resulting mixture.

The object of the present invention can be achieved also by a simple melt-kneading with an injection molding machine. In detail, a molded product having satisfactory physical properties can be obtained at a stroke, for example, by dry blending pellets obtained by granulation of Mixture (II) with the polyamide resin as component (D), and injection-molding the resulting blend directly.

In the process of the present invention, before melt-kneading the components, the components have preferably made into a uniform mixture of powder or pellet with an apparatus such as tumbler or Henschel mixer. However, there can be optionally employed a method in which the mixing is omitted and predetermined amounts of the components are individually fed to a meltkneading apparatus.

In the resin composition obtained according to the present invention may contain other constituents, for example, additives such as pigments, dyes, reinforcing agents, fillers, heat stabilizers, antioxidants, weathering stabilizers, nucleating agents, lubricants, antistatic agents, flame retardants, plasticizers and the like, or other polymers.

Particularly adding reinforcing agents or fillers, such as glass fibers suffered from various surface treatments, carbon fiber, talc, calcium carbonate, magnesium hydroxide, etc. to the resin composition obtained according to the process of the present invention gives a very useful material having a high stiffness and a high impact strength.

The resin composition obtained according to the present invention is molded by various molding methods such as injection molding, extrusion molding, etc.

The following examples serves to give specific illustration of the practice of the present invention but they are not intended in any way to limit the scope of the present invention. In the examples, the flexural modulus (sample thickness: 3.2 mm, measuring temperature: 23° C.) was measured according to JIS K7203 and the Izod impact strength (sample thickness: 3.2 mm, measuring temperatures: 23° C. and −40° C.; V-notched) according to JIS K7110. In Tables 1 and 2, "NB" indicates that the Izod impact strength was 50 kg.cm/cm or more and that a test piece was not broken.

The thermal deformation temperature (sample thickness: 3.2 mm, flexure stress: 4.6 kg f/cm$^2$) and the melt index (MI, 2160 g) were measured according to JIS K7207 and JIS K6760, respectively.

The amount of maleic anhydride added in the modified olefin polymer was determined by dissolving a small amount of an extruded sample in xylene, adding anhydrous acetone to cause precipitation, redissolving the thus purified sample in xylene, and titrating the resulting solution with a solution of KOH in ethanol with heating (85° C.) by using phenolphthalein as an indicator.

In the Examples and Comparative Examples, the following polyamide resins, modified olefin polymers and polyfunctional compounds were used.

(A) and (D): Polyamide resins
 (1) Polyamide 66, Maranyl ® A125 (polyhexamethylene adipamide mfd. by Unitika, Ltd.)
 (2) Polyamide 6, A1030BRL (poly-ε-caprolactam mfd. by Unitika, Ltd.)
(B): Modified olefin polymer (1) Modified polymer (1)
A modified polymer (1) was obtained by mixing 100 parts by weight of an ethylene propylene copolymer rubber [glass transition temperature: −58° C., propylene unit content: 22% by weight, MI (230° C.): 1.9 g/10 min] with 2 parts by weight of maleic anhydride, 0.08 part by weight of 1,3-bis(t-butylperoxyisopropyl)-benzene and 2 parts by weight of styrene, charging the resulting mixture into a twin screw extruder whose die has an inner diameter of 44 mm under a nitrogen atmosphere, and melt-kneading the same at a resin temperature of 250° C. The modified polymer (1) obtained had an amount of maleic anhydride added of 1.6% by weight and an MI (230° C.) of 0.3 g/10 min.

(2) Modified polymer (2)
A modified polymer (2) was obtained by mixing 100 parts by weight of a propylene-ethylene block copolymer [glass transition temperature: −43° C., ethylene unit content: 12.5% by weight, MI (230° C.): 3 g/10 min] with 1 part by weight of maleic anhydride, 1 part by weight of 1,3-bis(t-butylperoxyisopropyl)benzene, 0.5 part by weight of styrene and 0.1 part by weight of an antioxidant Irganox ® 1010, charging the resulting mixture into a twin screw extruder whose die has an inner diameter of 44 mm under a nitrogen atmosphere, and melt-kneading the same at a resin temperature of 230° C. The modified polymer (2) had an amount of maleic anhydride added of 0.3% by weight and an MI (230° C.) of 4.5 g/10 min.

(3) Modified polymer (3)
A modified polymer (3) was obtained by mixing 100 parts by weight of an ethylene-methyl methacrylate copolymer [glass transition temperature: −34° C., methyl methacrylate unit content: 38% by weight, MI (190° C.): 7 g/10 min] with 1 part by weight of maleic anhydride and 0.1 part by weight of t-butyl peroxylaulate, charging the resulting mixture into a twin screw extruder whose die has an inner diameter of 30 mm under a nitrogen atmosphere, and melt-kneading the same at a resin temperature of 200° C. The modified polymer (3) obtained had an amount of maleic anhydride added of 0.3% by weight and an MI (190° C.) of 4 g/10 min. (C): Polyfunctional compound (1) MB-1
A master batch prepared by melt-kneading 5 parts by weight of hexamethylenediamine carbamate with 95 parts by weight of Grilon ® CF6S (a copolymerization polyamide resin mfd. by EMS-CHEMIE AG) at 150° C. with a single screw vented extruder whose die has an inner diameter of 30 mm.

(2) Bondfast ® E (mfd. by Sumitomo Chemical Co.) Ethylene-glycidyl methacryl copolymer [glycidyl methacrylate unit content: 12% by weight, MI (190° C.): 3 g/10 min]

(3) E-DAM copolymer
Ethylene-dimethylaminoethyl methacrylate copolymer [dimethylaminoethyl methacrylate unit content: 28% by weight, MI (190° C.): 100 g/10 min]

(4) E-VA sapnified product
Saponified product of an ethylene-vinyl acetate copolymer [vinyl acetate unit content: 43% by weight, MI (190° C.): 70 g/10 min] [saponification rate: 99%, MI (190° C.): 35 g/10 min]

(5) MB-2
A master batch prepared by melt-kneading 5 parts by weight of 2,2'-(1,3-phenylene)-bis(2-oxazoline) with 95 parts by weight of Acryft ® WH303 at 200° C. with a single screw vented extruder whose die has an inner diameter of 30 mm.

Acryft® WH303: ethylene-methyl methacrylate copolymer (mfd. by Sumitomo Chemical Co.) [methyl methacrylate unit content: 18% by weight, MI (190° C.): 7 g/10 min]

Examples 1 to 9

Mixture (I) was obtained by melt-kneading together each component (A) and each component (B) listed in Table 1 with a single screw vented extruder whose die has an inner diameter of 30 mm at a prescribed temperature (270° C. for Polyamide 66 and 240° C. for Polyamide 6).

Mixture (II) was obtained by mixing Mixture (I) with each component (C) listed in Table 1, and melt-kneading the resulting mixture by the same single screw vented extruder as above at a prescribed temperature (270° C. for Polyamide 66 and 240° C. for Polyamide 6).

With a twin screw vented extruder whose die has an inner diameter of 44 mm equipped with a side-feed device, a polyamide resin composition was obtained by feeding Mixture (II) in a metering manner through a side-feed device provided in the middle of the extruder barrel, while melt-kneading each component (D) listed in Table 1 with the fed mixture at a prescribed temperature (270° C. for polyamide 66 and 240° C. for polyamide 6).

Table 1 shows the melt index of the resin composition obtained.

Each resin composition was dried at 80° C. for 12 hours and then made into test pieces for measuring physical properties, with a 10-ounce injection molding machine (Toshiba Model IS-150-V) at a die temperature of 70° C at a prescribed temperature (290° C. for polyamide 66 and 260° C. for polyamide 6).

Table 1 shows the flexural modulus, Izod impact strength and thermal deformation temperature of the test pieces thus obtained.

Comparative Examples 1 and 6

A mixture was obtained by melt-molding together each component (A) and the component (B) listed in Table 2 with a single screw vented extruder whose die has an inner diameter of 30 mm at a prescribed temperature (270° C. for polyamide 66 and 240° C. for polyamide 6).

The mixture was mixed with the component (C) listed in Table 2 and the resulting mixture was melt-kneaded with a twin screw vented extruder whose die has an inner diameter of 44 mm at a prescribed temperature (270° C. for polyamide 66 and 240° C. for polyamide 6) to obtain a resin composition.

Table 2 shows the results of evaluation of each of the resin compositions obtained in the same manner as in Example 1. Both of these resin compositions are inferior to those obtained in Examples 1 and 8 in flow properties, stiffness and thermal deformation temperature.

Comparative Example 2

A resin composition was obtained by mixing and melt-kneading the components (A), (B) and (C) listed in Table 2, in one lot at 240° C. with a twin screw vented extruder whose die has an inner diameter of 44 mm.

Table 2 shows the results of evaluation of the resin composition in the same manner as in Example 1. This resin composition is inferior to that of Example 1 in Izod impact strength.

Comparative Example 3

A resin composition was obtained by melt-kneading together the components (A) and (B) listed in Table 2 with a single screw vented extruder whose die has an inner diameter of 30 mm.

Table 2 shows the results of evaluation of the resin composition in the same manner as in Example 1. This resin composition is inferior to that of Example 1 in flow properties, stiffness and thermal deformation temperature.

Comparative Example 4

A mixture was obtained by melt-kneading the components (A) and (C) listed in Table 2 at 240° C. with a single screw vented extruder whose die has an inner diameter of 30 mm.

With a twin screw vented extruder whose die has an inner diameter of 44 mm equipped with a side-feed device, a resin composition was obtained by feeding the aforesaid mixture in a metering manner through the side-feed device provided in the middle of the extruder barrel, while melt-kneading the second component listed in Table 2 with the fed mixture at 240° C.

Table 2 shows the results of evaluation of the resin composition in the same manner as in Example 1. This resin composition is inferior to that of Example 2 in Izod impact strength.

Comparative Examples 5 and 7

In the same manner as in Example 1, Polyamide 6 or Polyamide 66 was molded and the physical properties of the molded products thus obtained were evaluated. Table 2 show the results obtained.

TABLE 1

| | Polyamide resin composition | | | |
|---|---|---|---|---|
| | Mixture (II) | | | |
| | Mixture (I) | | | |
| | Component (A) (parts by weight) | Component (B) (parts by weight) | Component (C) (parts by weight) | Component (D) (parts by weight) |
| Example 1 | Polyamide 6 45 | Modified polymer (1) 45 | MB-1 10 | Polyamide 6 125 |
| Example 2 | Polyamide 6 45 | Modified polymer (1) 45 | Bondfast ® E 10 | Polyamide 6 125 |
| Example 3 | Polyamide 6 45 | Modified polymer (1) 45 | Copolymer E-DAM 10 | Polyamide 6 125 |
| Example 4 | Polyamide 6 45 | Modified polymer (1) 45 | E-VA Saponified product 10 | Polyamide 6 125 |
| Example 5 | Polyamide 6 45 | Modified polymer (1) 45 | MB-2 10 | Polyamide 6 125 |
| Example 6 | Polyamide 6 | Modified polymer (2) | MB-1 | Polyamide 6 |

TABLE 1-continued

| | | | | |
|---|---|---|---|---|
| Example 7 | Polyamide 6 45 | Modified polymer (3) 45 | MB-1 10 | Polyamide 6 125 |
| Example 8 | Polyamide 66 45 | Modified polymer (1) 45 | MB-1 10 | Polyamide 66 125 |
| Example 9 | Polyamide 66 40 | Modified polymer (1) 50 | Bondfast ® E 10 | Polyamide 66 200 |

| | Physical properties of polyamide resin composition | | | | |
|---|---|---|---|---|---|
| | MI2160 g, 230° C. (g/10 min) | Flexural modulus (kg/cm$^2$) | Izod impact strength (kg · cm/cm) 23° C. | -40° C. | Thermal deformation temp. (4.6 kg/cm$^2$) (° C.) |
| Example 1 | 15 | 17500 | NB | 14 | 165 |
| Example 2 | 11 | 18000 | NB | 14 | 160 |
| Example 3 | 10 | 17100 | NB | 13 | 159 |
| Example 4 | 9 | 17000 | NB | 11 | 161 |
| Example 5 | 12 | 17300 | NB | 11 | 160 |
| Example 6 | 25 | 22100 | 36 | 10 | 162 |
| Example 7 | 9 | 17000 | NB | 11 | 163 |
| Example 8 | 13 | 17800 | NB | 17 | 200 |
| Example 9 | 10 | 18500 | NB | 18 | 197 |

TABLE 2

| | Polyamide resin composition | | | |
|---|---|---|---|---|
| | Mixture (II) | | | |
| | Mixture (I) | | | |
| | Component (A) (parts by weight) | Component (B) (parts by weight) | Component (C) (parts by weight) | Component (D) (parts by weight) |
| Comparative Example 1 | Polyamide 6 170 | Modified polymer (1) 45 | MB-1 10 | — |
| Comparative Example 2 | Polyamide 6 170 | Modified polymer (1) 45 | MB-1 10 | — |
| Comparative Example 3 | Polyamide 6 180 | Modified polymer (1) 45 | — | — |
| Comparative Example 4 | Polyamide 6 45 | — | Bondfast ® E 55 | Polyamide 6 125 |
| Comparative Example 5 | — | — | — | Polyamide 6 |
| Comparative Example 6 | Polyamide 66 240 | Modified polymer (1) 50 | MB-1 10 | — |
| Comparative Example 7 | — | — | — | Polyamide 66 |

| | Physical properties of polyamide resin composition | | | | |
|---|---|---|---|---|---|
| | MI2160 g, 230° C. (g/10 min) | Flexural modulus (kg/cm$^2$) | Izod impact strength (kg · cm/cm) 23° C. | -40° C. | Thermal deformation temp. (4.6 kg/cm$^2$) (°C.) |
| Comparative Example 1 | 3 | 16800 | NB | 13 | 152 |
| Comparative Example 2 | 4 | 16100 | 7 | 5 | 170 |
| Comparative Example 3 | 4 | 16400 | NB | 13 | 125 |
| Comparative Example 4 | 20 | 18100 | 20 | 7 | 167 |
| Comparative Example 5 | 34 | 26300 | 2 | 1 | 178 |
| Comparative Example 6 | 3 | 16700 | NB | 17 | 185 |
| Comparative Example 7 | 68 | 29000 | 4 | 3 | 231 |

As described above, according to the present invention, there is provided a process for producing a polyamide resin composition which is markedly advantageous in having a very good balance in various properties of molded product (for example, mechanical properties such as impact resistance and the like), thermal properties and a good appearance.

In particular, it is a surprising finding unanticipated from the prior art that conducting the melt-kneading by a specific two-step blending improves the resistance to thermal deformation of the product without a reduction of the impact resistance.

The polyamide resin composition provided by the present invention exhibits a good flow properties and can easily be processed into a molded product, a film, a sheet or the like by a molding method used for conventional polyamide resin compositions, for examples, injection molding, extrusion molding or the like. Moreover, the molded product has a very good balance in physical properties such as impact resistance, stiffness, heat resistance, etc., and a uniform and smooth appearance.

What is claimed is:

1. A process for producing an impact-resistant polyamide resin which comprises
   (1) preparing Mixture (I) by melt-kneading (A) 60 to 20 parts by weight of a polyamide resin with (B) 40 to 80 parts by weight of at least one modified olefin polymer having a glass transition temperature of $-10°$ C. or lower selected from the group consisting of copolymer rubbers of ethylene and an $\alpha$-olefin having 3 or more carbon atoms which rubbers have 0.01 to 9% by weight of an unsaturated dicarboxylic acid anhydride added thereto ethylene-ethylenically unsaturated ester copolymers having 0.01 to 9% by weight of an unsaturated dicarboxylic acid anhydride added thereto,
   (2) preparing Mixture (II) by melt-kneading 100 parts by weight of Mixture (I) with (C) 0.01 to 20 parts by weight of a polyfunctional compound selected from the group consisting of aliphatic diamine carbamates, aliphatic polyamines, alicyclic polyamines and aromatic amines, and
   (3) melt-kneading 100 parts by weight of Mixture (II) with (D) 50 to 1,000 parts by weight of a polyamide resin.

2. A process for producing an impact-resistant polyamide resin composition which comprises
   (1) preparing Mixture (I) by melt-kneading (A) 60 to 20 parts by weight of a polyamide resin with (B) 40 to 80 parts by weight of a modified olefin polymer obtained by melt-kneading 100 parts by weight of at least one olefin polymer having a glass transition temperature of $-10°$ C. or lower selected from the group consisting of copolymer rubbers of ethylene and an $\alpha$-olefin having 3 or more carbon atoms and ethylene-ethylenically unsaturated ester copolymers, with 0.1 to 10 parts by weight of an unsaturated dicarboxylic acid anhydride,
   (2) preparing Mixture (II) by melt-kneading 100 parts by weight of Mixture (I) with (C) 0.01 to 20 parts by weight of a polyfunctional compound selected from the group consisting of aliphatic diamine carbamates, aliphatic polyamines, alicyclic polyamines and aromatic amines, and
   (3) melt-kneading 100 parts by weight of Mixture (II) with (D) 50 to 1,000 parts by weight of a polyamide resin.

3. A process according to claim 2, wherein the modified olefin polymer (B) is obtained by melt-kneading 100 parts by weight of at least one olefin polymer having a glass transition temperature of $-10°$ C. or lower selected from the group consisting of copolymer rubbers of ethylene and an $\alpha$-olefin having 3 or more carbon atoms and ethylene-ethylenically unsaturated ester copolymers, with 0.1 to 10 parts by weight of an unsaturated dicarboxylic acid anhydride and 0.01 to 50 parts by weight of an aromatic vinyl monomer.

4. A process according to claim 2, wherein the unsaturated dicarboxylic acid anhydride added to the modified olefin polymer (B) is maleic anhydride.

5. A process according to claim 1, wherein the copolymer rubber is an ethylene-propylene copolymer.

6. A process according to claim 2, wherein the copolymer rubber is an ethylene-propylene copolymer.

7. A process according to claim 1, wherein the polyfunctional compound is hexamethylenediamine carbamate.

8. A process according to claim 2, wherein the polyfunctional compound is hexamethylenediamine carbamate.

* * * * *